US008471199B1

(12) United States Patent
Doroshenko et al.

(10) Patent No.: US 8,471,199 B1
(45) Date of Patent: Jun. 25, 2013

(54) PORTABLE MASS SPECTROMETER WITH ATMOSPHERIC PRESSURE INTERFACE

(75) Inventors: Vladimir M. Doroshenko, Sykesville, MD (US); Victor V. Laiko, Columbia, MD (US); Alexander S. Misharin, Columbia, MD (US)

(73) Assignee: Science and Engineering Services, Inc., Columbia, MD (US)

( * ) Notice: Subject to any disclaimer, the term of this patent is extended or adjusted under 35 U.S.C. 154(b) by 0 days.

(21) Appl. No.: 13/441,532

(22) Filed: Apr. 6, 2012

(51) Int. Cl.
*B01D 59/44* (2006.01)
*H01J 49/00* (2006.01)

(52) U.S. Cl.
USPC ........... 250/281; 250/282; 250/283; 250/287; 250/288; 250/290; 250/291; 250/292; 250/293

(58) Field of Classification Search
USPC .................. 250/281–283, 287, 288, 290–293
See application file for complete search history.

(56) References Cited

U.S. PATENT DOCUMENTS 6,777,671 B2 8/2004 Doroshenko
7,256,395 B2 * 8/2007 Collings et al. ............... 250/288
7,259,371 B2 * 8/2007 Collings et al. ............... 250/288
8,304,718 B2 * 11/2012 Ouyang et al. ................ 250/288
2008/0067349 A1 3/2008 Doroshenko et al.

OTHER PUBLICATIONS

Misharin et al. “Development and characterization of a field deployable ion-trap mass spectrometer with an atmospheric pressure interface” Anal.Chem 2012,84,10105-10112.*

* cited by examiner

*Primary Examiner* — Jack Berman
*Assistant Examiner* — Meenakshi Sahu
(74) *Attorney, Agent, or Firm* — Oblon, Spivak, McClelland, Maier & Neustadt, L.L.P.

(57) ABSTRACT

A portable mass spectrometer having an atmospheric pressure interface for introducing ions generated at ambient pressure gas conditions into a vacuum of the mass spectrometer. The mass spectrometer has a vacuum chamber having at least one vacuum section and at least one gas inlet for directing the ambient pressure gas including the ions into the at least one vacuum section. The at least one gas inlet has a gas passage channel of a length L and a limiting cross section S with a ratio of L/S being less than 20,000 $cm^{-1}$. The mass spectrometer has a radio frequency (RF) ion guide in the at least one vacuum section positioned for collecting the ions from the at least one gas inlet and transmitting the ions further to a mass analyzer for analyzing the ions transmitted from the ion guide.

20 Claims, 5 Drawing Sheets

PORTABLE MASS SPECTROMETER WITH ATMOSPHERIC PRESSURE INTERFACE

BACKGROUND OF THE INVENTION

1. Field of the Invention

This invention is related to interfacing an ion source generating ions at ambient pressure conditions to a mass spectrometer. More specifically, it is related to interfacing an atmospheric pressure ion source to a portable mass spectrometer.

2. Description of the Related Art

Most of commercial mass spectrometers (MS) are made for lab use and usually are equipped with various ionization sources to analyze different chemical compounds. Atmospheric pressure (AP) ionization sources are of special importance as these sources are efficient and interchangeable to cover wide range of chemicals using the same mass analyzer. Typical examples of the atmospheric ionization methods are: electrospray ionization (ESI), atmospheric pressure chemical ionization (APCI), atmospheric pressure matrix-assisted laser desorption/ionization (AP-MALDI), atmospheric pressure photoionization (APPI), direct analysis in real time (DART) available from IonSense, Inc., desorption ESI (DESI), secondary ESI (s-ESI) and any combination thereof. As mass analyzers operate in vacuum, a common feature of all mass spectrometers utilizing AP ionization sources is an atmospheric pressure interface (API) which serves the function of ion delivery from the atmospheric (ambient) pressure conditions existing in the atmospheric pressure ion source to the vacuum of the mass spectrometer with minimal ion loss for further MS analysis. The API design is important for mass spectrometer performance as it determines its sensitivity.

Modern mass spectrometers utilize complicated API designs to achieve the highest sensitivity. Typically, the API design includes a gas inlet port (typically, a thin capillary or small orifice) and several differentially pumped vacuum sections separated by conductance limiting orifices so the ions move from one section to the other through the conductance orifices while the gas is pumped out separately from each section to get the best vacuum in the last vacuum section. Ion guides used for guiding ions through the differentially pumped vacuum sections can operate using different physical principles based on static (DC) and radio-frequency (RF) electric fields, magnetic field, and/or gas dynamic methods.

An API design is a tradeoff between mutually contradicting requirements for gas throughput, ion guidance/focusing, and gas loads on the vacuum pumps of the differentially pumped sections. It is clear that the larger air flow into mass spectrometer the better MS sensitivity. At the same time, the larger the air flow the larger pumps are required to maintain the good vacuum. In reality, the available pumps determine the MS air throughput. In addition, the pumping power in different vacuum sections is optimized to minimize loss of ions in transfer between sections and accommodate available pump capacities. The types of pumps used for pumping sections at different pressure can also be different. All these requirements result in typical differential pumping schemes and pressure distributions between the vacuum sections that are similar in all commercial MS systems. As an example of such similarity, the pressure in the first vacuum section in typical API designs is always about 1 Torr (practically, in the range between 0.3 to 3 Torr). Further, the 1 Torr pressure in the first vacuum section is provided by a mechanical pump, typically of a rotary vane type.

With current requirements on increasing MS sensitivity, the gas throughput in commercial MS systems has a tendency to increase because the gas throughput directly relates to the MS sensitivity. Typical solutions for increasing MS sensitivity include the use of multiple inlet capillaries and ion funnel focusing technology capable of operating at the pressures up to 30 Torr in the first vacuum section.

Portable mass spectrometry is a new direction in mass spectrometry playing an increasingly important role in numerous field applications ranging from battlefield chemical analysis to oceanographic research. As with lab instruments, the atmospheric pressure ionization methods are important for portable mass spectrometers too. However, as a small size of portable mass spectrometers automatically implies low pumping capacity, the interface to an AP ion source for portable mass spectrometers becomes a real challenge (A. Keil, N. Talaty, C. Janfelt, R. J. Noll, L. Gao, Z. Ouyang, R. G. Cooks, "Ambient Mass Spectrometry with a Handheld Mass Spectrometer at High Pressure", Anal. Chem., 2007, vol. 79, pp. 7734-7739).

The entire contents of the references listed in this application are incorporated herein in their entirety by reference.

SUMMARY OF THE INVENTION

According to one embodiment of the invention, there is provided a portable mass spectrometer having an atmospheric pressure interface for introducing ions generated at ambient pressure gas conditions into a vacuum of the mass spectrometer. The mass spectrometer has a vacuum chamber having at least one vacuum section and at least one gas inlet for directing the ambient pressure gas including the ions into the at least one vacuum section. The at least one gas inlet has a gas passage channel of a length L and a limiting cross section S with a ratio of L/S being less than 20,000 $cm^{-1}$. The mass spectrometer has a radio frequency (RF) ion guide in the at least one vacuum section positioned for collecting the ions from the at least one gas inlet and transmitting the ions further to a mass analyzer, and has one or more turbomolecular pumps in gas communication with the at least one vacuum section. The one or more turbomolecular pumps pump out a majority of the gas directed into the at least one vacuum section by the at least one gas inlet.

According to one embodiment of the invention, there is provided a portable mass spectrometer with an atmospheric pressure interface for introducing ions generated at ambient pressure gas conditions into a vacuum of the mass spectrometer. The mass spectrometer has a vacuum chamber having at least one vacuum section and at least one gas inlet for directing the ambient pressure gas including the ions into the at least one vacuum section. The gas inlet has a gas passage channel of a length L and a limiting cross section S with a ratio of L/S being less than 20,000 $cm^{-1}$. The mass spectrometer has a radio frequency (RF) ion guide in a the at least one vacuum section positioned for collecting the ions from the gas inlet and transmitting the ions further to a mass analyzer. The mass spectrometer has at least one pump in gas communication with the at least one vacuum section for pumping the at least one vacuum section to less than 50 mTorr pressure.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
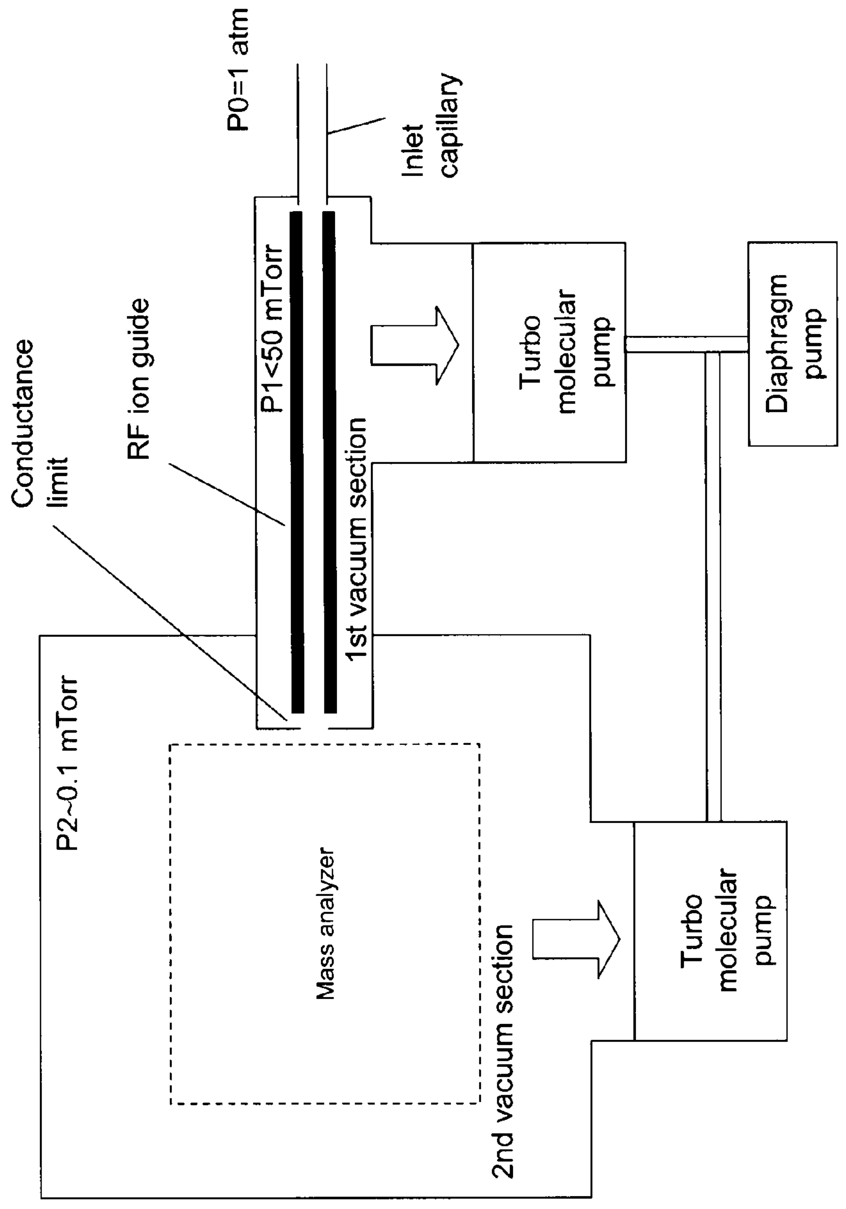
FIG. 1 shows a scheme of the proposed atmospheric pressure interface for a portable mass spectrometry.

Because of low pumping capacity, most of the methods used for increasing sensitivity in lab API MS instruments are not applicable to a portable mass spectrometry. Alternative methods have been developed. A discontinuous API (DAPI) is one example of the alternative methods. DAPI is based on pinching a flexible inlet capillary to allow the gas throughput only at the time of filling an ion trap cell (L. Gao, R. G. Cooks, Z. Ouyang, "Breaking the Pumping Speed Barrier in Mass Spectrometry: Discontinuous Atmospheric Pressure Interface", Anal. Chem., 2008, vol. 80, pp. 4026-4032). While allowing substantial gas load reduction, the DAPI method has its own disadvantages such as large vacuum chamber required for handling the pressure surge during capillary opening, uncontrollable ion loss in the flexible capillary and overall complexity of vacuum control.

Obtaining good sensitivity in API portable mass analyzers comparable to that of desktop lab commercial MS systems is not straightforward. As an example, to maintain good sensitivity the MT Explorer 100, a portable field-deployable ion trap mass spectrometer produced by MassTech, Inc. (Columbia, Md.), utilizes two (2) Adixen/Pfeiffer Vacuum Inc. (Hingham, Mass.) molecular drag pumps MDP 5011 to pump out the first 1 Torr vacuum section that brings additional weight and cost to the system. A need exists for efficient transfer of atmospheric (ambient) pressure ions into the vacuum of portable mass spectrometers using a pump system with minimal pumping capacity.

The above need is met by this invention using an efficient introduction of ions from the ambient pressure conditions into the vacuum of a portable mass spectrometer using a low gas flow inlet capillary optimized for minimum ion loss on the capillary wall with delivery of the ions directly into a vacuum section pumped out by a at least one turbomolecular pump or at least one pump having a turbomolecular stage (typically to the pressure below 50 mTorr). The vacuum section includes an RF ion guide for efficient collection of ions from the inlet capillary.

This invention was made after the careful analysis of the loss of ions during their introduction from the ambient pressure conditions into the vacuum of the mass spectrometer. For the purpose of this invention, the ambient pressure conditions are defined as those that can be observed in ion sources operated at the atmospheric pressure and near atmospheric pressure conditions, typically at 30-3,000 Torr.

There are two major ion loss mechanisms in the process of ion transfer from the ambient pressure ion source to the mass spectrometer: (a) the ion loss inside the inlet capillary used for ion transfer from the ambient pressure to the first (e.g., 1 Torr) vacuum section of the mass spectrometer due to diffusion of ions to the capillary wall; and (b) the loss during transfer of the ions through the first vacuum section of the MS vacuum chamber to the second (e.g., lower pressure, usually less than 50 mTorr) vacuum section due to inefficient ion guiding through the first vacuum section and the conductance limiting orifice (a conductance limit) between the first and the second vacuum sections, mainly due to the high pressure in the first vacuum section.

Ion loss in an inlet capillary has been studied earlier (B. Lin, J. Sunner, "The Process of Ion Transport by Viscous Gas Flow through Capillaries", J. Am. Soc. Mass Spectrom. 1994, vol. 5, pp. 873-885). Ion transmittance T of a capillary can be calculated using the following formula:

$$T = b\exp\left[-\frac{18.16DLP}{Q}\right] \tag{1}$$

where Q is a gas throughput through the capillary:

$$Q = \left(\frac{S^2}{8\pi\mu L}\right)P_{av}\Delta P \tag{2}$$

D is the diffusion coefficient and μ is the viscosity of the gas, L is the length and S is the cross section area of the capillary channel, P is the gas pressure at the capillary entrance, $P_{av}$ is the average pressure and ΔP is the pressure drop across the capillary; the factor b≈0.5 for narrow capillaries (i.d.<0.5 mm).

One can see that the ion transmittance directly depends on the gas throughput only, not on the capillary cross section area. This is important for the case where the capillary is a combination of several sections of different diameter. The ion transmittance of such combined capillary is determined by the total capillary length and the gas throughput which in turn is usually determined by the capillary section with the smallest diameter d because the gas throughput very strongly (as $d^4$) depends on the capillary i.d. according to the formula (2). For this reason, the inventors have found it useful to introduce a term of a limiting cross section S which determines the gas throughput of the total capillary so the ion transmittance will depend on the ratio of L/S.

Figure 3:
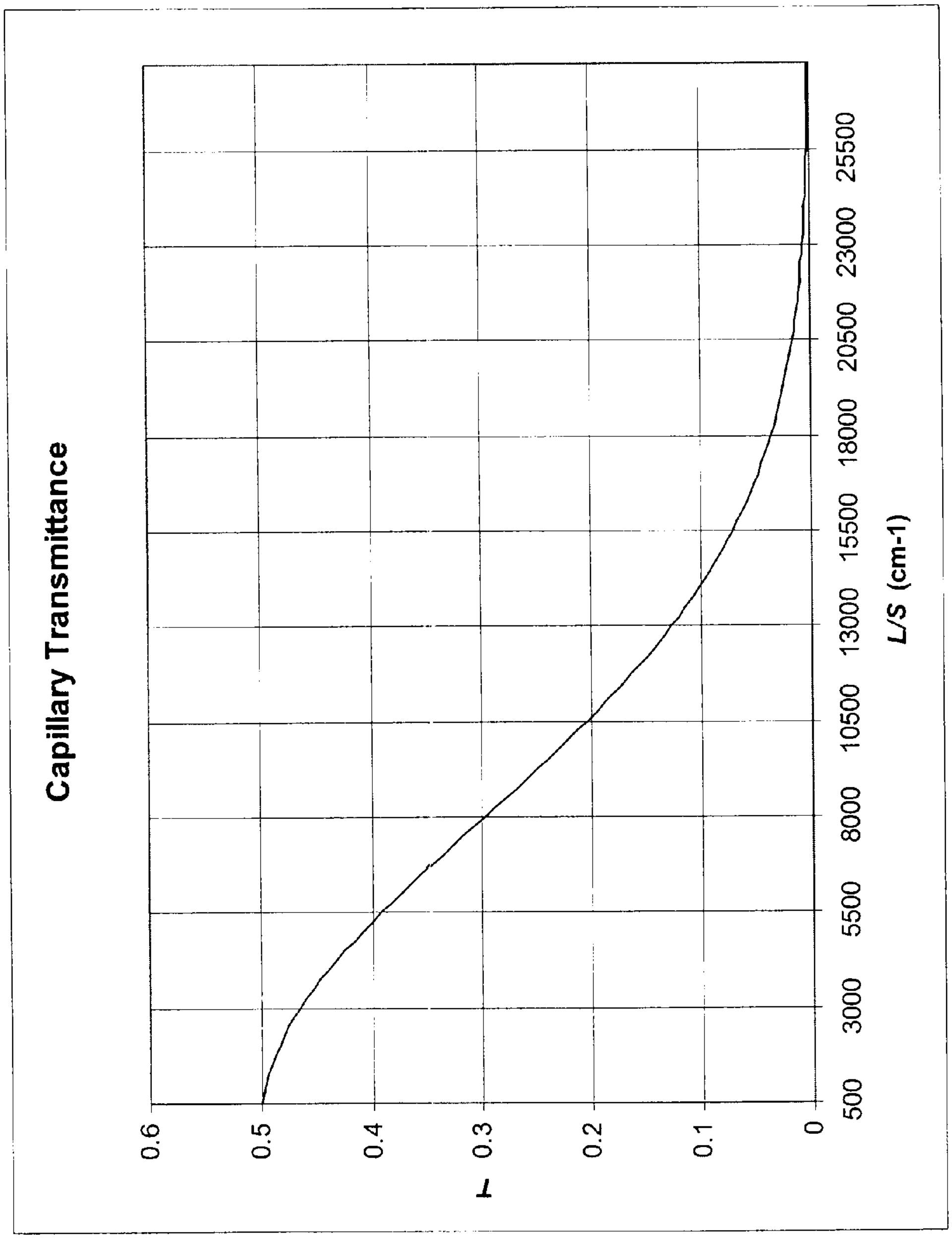
FIG. 3 shows the dependence of the ion transmittance of the inlet capillary upon the capillary parameters: the capillary length L and the limiting cross section S.

Dependence of the ion transmission on the L/S ratio for room temperature air is shown in FIG. 3. One can see from the data shown in FIG. 3 that for any capillary i.d. one can select the capillary length at which the ion loss will be minimal (for example, T>0.25 for L/S<9,000 $cm^{-1}$ but reasonable transmittance is observed at L/S<20,000 $cm^{-1}$). This means that the capillary parameters (such as temperature, cross section and length of the capillary) can be optimized to minimize ion loss inside the capillary for any given gas throughput through the capillary. (However, there are some practical limits for capillary internal diameter values as too narrow capillaries are prone to clogging). In view of this finding, the sensitivity of MS systems utilizing capillary gas inlets optimized for minimal ion loss on the capillary walls will be approximately proportional to the API gas inlet flow rate. For portable MS systems having small pumping capacity, this immediately results in lower MS sensitivity.

Ion loss in the first (1 Torr) vacuum section is due to inefficient ion guiding and focusing means used to transfer the ions toward the following second vacuum section. At about 1 Torr pressure, the ion motion can be controlled using static or radio frequency (RF) electric fields and gas dynamic methods. The purpose of an ion guide is to spatially transmit ions, typically from one vacuum section to another one and further toward a mass analyzer located downstream of the ion guide.

The RF-based multipole ion guides cannot create substantial trapping pseudopotential at high pressures and for this reason cannot be efficient in the Torr pressure range. The static electric field and gas dynamic methods can control the ion motion at 1 Torr but efficient ion focusing into 1 mm area (typical diameter of the conductance limiting orifice between the first and the second vacuum sections) using static electric field and gas dynamic methods is problematic. The ion defocusing effect due to the gas dynamic flow is too great in the first vacuum section as more than 90% of the gas flow is diverted into the vacuum pump pumping out this section. The ion funnel (another RF ion guiding device) can be used at pressures up to 30 Torr, but the ion funnel has its own limitations (e.g., the outlet orifice should be more than 2 mm in diameter to avoid discrimination against low mass ions, thus, imposing too large gas load requirements for the pumps in the second vacuum section). In addition, it is too complicated and requires powerful RF power supply that precludes its wide use in portable MS analyzers.

Despite the problems with focusing ions in radial direction at high pressures, the multipole RF ion guides have been widely used in the first vacuum section at about 1 Torr pressure region (A. F. Dodonov, V. I. Kozlovski, I. V. Soulimenkov, V. V. Raznikov, A. V. Loboda, Z. Zhen, T. Hortwarth, H. Wolnik, "High Resolution Electrospray Ionization Orthogonal-injection Time-of-flight Mass Spectrometer", Eur. J. Mass Spectrom., 2000, vol. 6, pp. 481-490; B. A. Collings, M. Guna, H. Javaheri, A. V. Loboda, B. A. Thomson, U.S. Pat. No. 7,256,395, Aug. 14, 2007; B. A. Collings, T. R. Covey, M. Guna, H. Javaheri, A. V. Loboda, B. B. Schneider, B. A. Thomson, U.S. Pat. No. 7,259,371, Aug. 21, 2007). To fight the gas dynamic defocusing effect in the first vacuum chamber, the inventors of U.S. Pat. Nos. 7,256,395 and 7,259,371 suggested confining all Mach barrel shock structure of the supersonic free jet expansion after the gas inlet aperture within the multipole RF ion guide to improve focusing of ions entrained by the supersonic free jet. However, the inventors of those patents concluded that, if the pressure in the first vacuum section is too low, then the barrel shock structure diameter becomes too high resulting in too large inscribed diameter and large RF voltages used in the RF multipole ion guide confining the barrel shock structure. This makes this method impractical at low pressures as "larger voltages can cause electrical breakdown and discharge, which can interfere with proper function of the ion guide and can introduce considerable complexity to the instrument for safe and reliable operation" as set forth in U.S. Pat. No. 7,256,395.

Particularly, the inventors of U.S. Pat. No. 7,256,395 teach that "it is the most effective to keep the pressure relatively high" and "effective focusing action can be obtained at a pressure between about 1 and 10 torr" (between 0.1 and 10 Torr in their claims).

In the invention described herein, the solution of the above problem of ion loss during the ion introduction into the vacuum of a portable mass analyzer was found in complete elimination of the first 1-Torr section and introduction of ions directly into the vacuum section pumped out by a turbomolecular pump (or by a hybrid pump having a turbomolecular pumping stage, e.g. a so-called turbo/drag pump). Pressure in the abovementioned section is typically less than 10-50 mTorr, depending on the pump used. This pressure range is about two orders of the magnitude lower than that typically maintained in the first vacuum section of modern mass spectrometer instruments.

Herein, a turbomolecular pump or a turbomolecular stage of a hybrid pump is defined as typically having a stack of rotors, each having multiple, angled blades, rotating at high frequencies (e.g. 90,000 rotations per minute) between a stack of stators. Momentum transfer from the mechanical motion of the rotors to the gas motion is mainly by impact. This principle of operation of turbomolecular pumps is different from that of the molecular drag pumps in which momentum transfer from mechanical motion to gas motion is by "imparting the motion of a rapidly rotating solid surface to the gas molecules between a fixed and rotating surface. One can say that the molecules being pumped are literary dragged along the surface, hence the term, molecular drag pump". [http://www.vacuumlab.com/Articles/Sorting%20Out%20Turbo%20Drag.pdf].

Typically, turbomolecular, hybrid turbo/drag, and molecular drag pumps are capable of operating in 10-50 mTorr range; however, in this pressure range, molecular drag pumps typically have an order of the magnitude lower pumping speed compared to turbomolecular pumps of equivalent size. [http://www.vacuumlab.com/Articles/Sorting%20Out%20Turbo%20Drag.pdf].
Therefore, utilization of the turbomolecular or hybrid turbo/drag pumps is preferred for the purposes of the present invention since pumps of those types will permit higher gas throughput through the vacuum system of a portable mass spectrometer given the same pressure in its first vacuum section (10-50 mTorr).

Throughout this patent the terms "turbomolecular pump" and "turbo pump" are equally used to refer to any pump having a turbomolecular pumping stage within it, such as in "turbomolecular," or "hybrid turbo/drag" type pumps. Almost all currently available commercial turbo pumps can be backed up by diaphragm pumps generating vacuum as low as 2-6 Torr, which makes this scheme suitable for using in portable mass spectrometers.

The inventors of this application have discovered that a very high guiding and focusing efficiency of multipole RF ion guides operated at 10-50 mTorr (which is close to optimal pressures for RF ion guide operation) combined with a gas inlet design optimized for minimum ion loss on the capillary walls resulted in a portable MS system having sensitivity comparable to that of commercial desktop MS systems, while the inlet gas flow rate in this portable mass analyzer was almost an order of the magnitude lower compared to that of the commercial desktop MS systems. Such an ion introduction scheme has never been used neither in portable nor in desktop MS systems.

Figure 5:
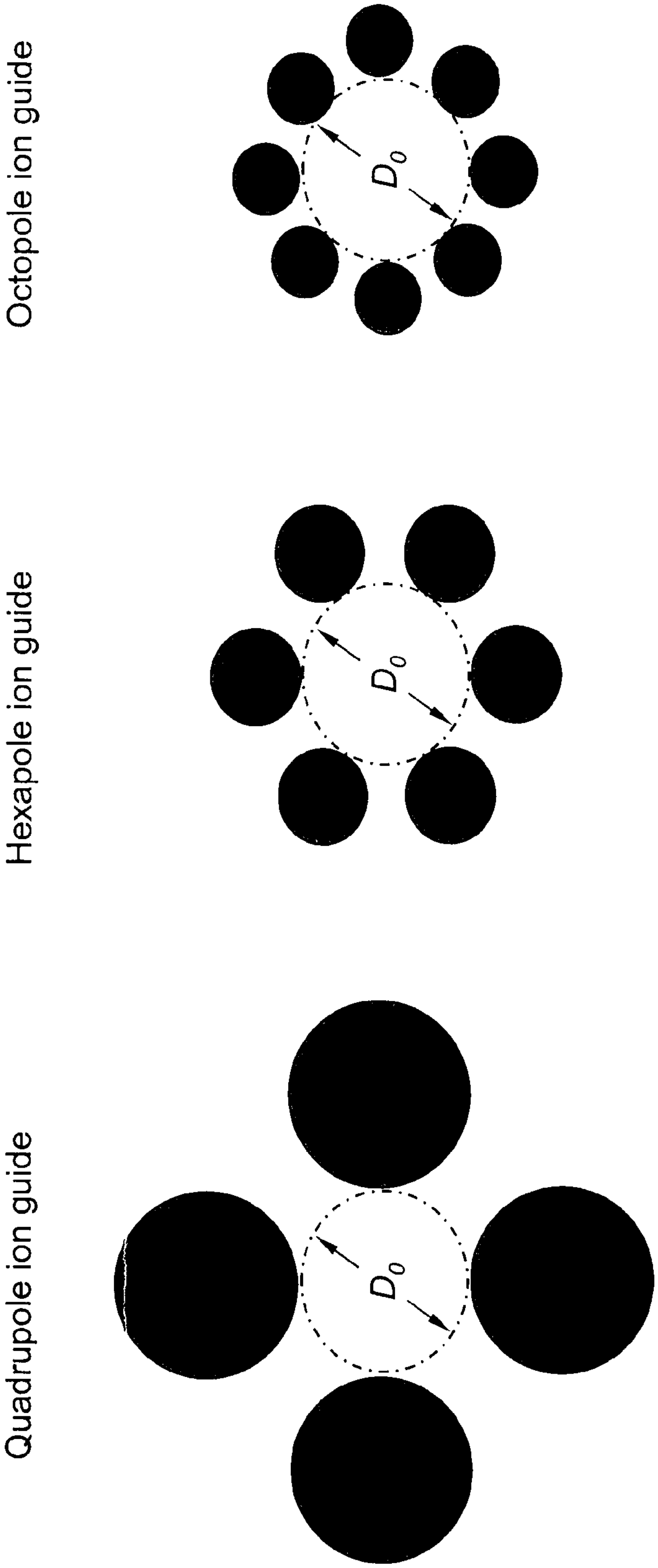
FIG. 5 schematically shows quadrupole, hexapole, and octopole ion guides that can be used in this invention.

In the present invention, an RF multipole ion guide with a regular inscribed diameter $D_0$ (typically 2-10 mm, as shown in FIG. 5) is used in the first vacuum section pumped down to a low pressure (typically, below 50 mTorr) so that the gas dynamic flow is replaced by molecule motion (the mean free path is in the range of millimeters that is larger or comparable to the inlet capillary channel and ion guide pole diameters). At these pressures, the electric forces prevail over the gas dynamic drag forces, which makes the gas dynamic effects negligible and the trapping, focusing and guiding of ions by an RF ion guide extremely effective. Combining this scheme with optimal inlet capillary design makes this combination suitable for portable mass spectrometry applications.

Exemplary Embodiments

Exemplary and illustrative non-limiting embodiments of a portable mass spectrometer with an atmospheric pressure interface according to this invention are described below.

The mass spectrometer instrument has an atmospheric pressure interface including a 40 mm-long, 180 μm i.d. heated stainless steel inlet capillary (labeled "10" in FIG. 4) providing the ratio of L/S=15,700 $cm^{-1}$. The capillary temperature is typically maintained at 140° C. for small molecules analysis using a corona discharge, and 220° C. for analysis of peptides using an AP-MALDI or an electrospray (ESI) ion source.

Mass analyzer ("20", FIG. 4) of the instrument is a 3D quadrupole ion trap having standard hyperbolic ring ("140") and end-cap ("130") electrodes with a ring electrode radius $r_0$=0.707 cm (but mass analyzers of other types can also be used). It is located in the second vacuum section of the instrument ("30", FIG. 4). Pressure drop from the ion source (~1 atmosphere) to typically less than 0.1 mTorr background air pressure in the mass analyzer region is provided by two stages of differential pumping ("50" and "80").

The pressure in the first vacuum stage ("40", FIG. 4) which follows the inlet capillary is maintained at around 20 mTorr using Pfeiffer HiPace 80 turbo pump ("50", FIG. 4) backed by a Pfeiffer MVP 020-3DC diaphragm pump (Pfeiffer Vacuum GmbH, Germany; "60", FIG. 4).

Figure 4:
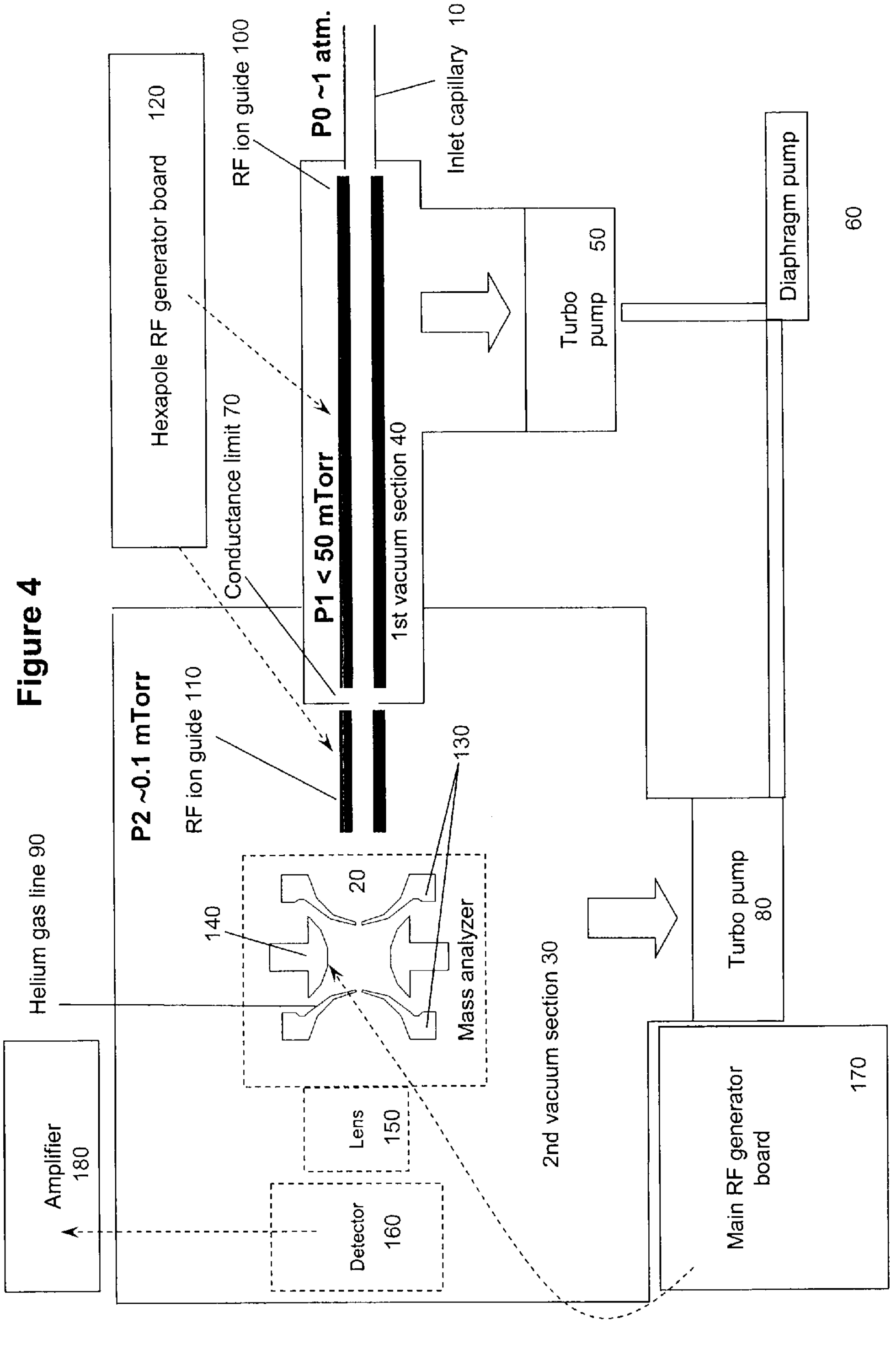
FIG. 4 shows an embodiment designed according to this invention.

The first and the second vacuum stages of the instrument are separated by 0.75 mm diameter, 0.6-mm thick conductance limiting diaphragm (a conductance limit, labeled "70" in FIG. 4). The air pressure in the second vacuum section is typically maintained on the level below $10^{-4}$ Torr by a Pfeiffer HiPace 80 turbo pump ("80", FIG. 4) backed by the above-mentioned Pfeiffer MVP 020-3DC diaphragm pump ("60", FIG. 4).

This configuration of the instrument's vacuum system allows for about 60-80 mL air throughput through it when the inlet capillary is maintained at 140-220° C. (compared to 500-1000 mL/min typical for commercial lab MS systems).

For operation of the ion trap mass analyzer, helium (Matheson, Parsippany N.J.) is supplied inside the trap using a gas line with a flow restrictor (labeled "90" in FIG. 4) which is a 63.5-μm ID capillary designed for dropping the helium pressure from 30 PSI at the capillary inlet to about 1 mTorr inside the 3D ion trap. A relative small size helium cylinder (not shown in FIG. 4) is sufficient to supply He for more than a month of continuous ion trap operation.

Ion transfer optics in the first vacuum section of the instrument includes a hexapole ion guide (labeled "100" in FIG. 4). The hexapole has inscribed radius of 2.54 mm, and diameter of the rods 1.2 mm. The length of the hexapole in the first vacuum section is 76.7 mm.

Ion transfer from the conductance limit "70" to the mass analyzer "20" in the second vacuum section "30" of the instrument is facilitated by another hexapole ion guide ("110", FIG. 4) having length 30.5 mm, inscribed diameter 2.54 mm and diameter of the rods 1.2 mm.

Both hexapole ion guides (labeled "100" and "110", FIG. 4) are driven in this embodiment by a single radio frequency (RF) voltage generator ("120", FIG. 4) of a commercial MT Explorer 100 ion trap mass spectrometer (MassTech Inc., Columbia Md.) at 2 MHz frequency. The hexapole RF generator is capable of providing up to 1 kVp-p RF output across the ion guides along with DC bias potentials across all ion optics elements including the inlet capillary ("30"), ion guides ("120" and "110"), conductance limiting diaphragm ("70"), end cap ("130", FIG. 4) and ring ("140", FIG. 4) electrodes of the quadrupole ion trap, and a lens electrode (labeled "150" in FIG. 4) in between of the ion trap ("20") and the ion detector assembly ("160"). The ion detector assembly (ETP model DM286; SGE Inc., Austin Tex.; "160", FIG. 4), includes a conversion dynode electrode and a discrete-dynode electron multiplier. High voltage potentials required for operation of the dynode (±10 kV, maximum) and multiplier (−3 kV, maximum) are provided by EMCO high voltage switching power supplies (EMCO High Voltage Corporation, Sutter Creek, Calif.) integrated into the hexapole RF generator board "120" (FIG. 4).

The main ion trap RF generator which provides potentials across the ring and end cap electrodes of the 3D ion trap (main RF generator, "170" in FIG. 4) is the same as used in commercial MT Explorer 100 (MassTech, Columbia Md.) ion trap mass spectrometer instruments. It is capable of generating up to 20 kVp-p waveforms when operated at a resonance frequency (~700 kHz) determined by parameters of the LC contour which includes the ring electrode of the ion trap, and a load coil of the main RF generator, each surrounded by many adjacent instrument elements such as end cap electrodes, coil enclosure, etc., which become parts of the radiofrequency resonance contour.

Auxiliary excitation waveforms applied across the end cap electrodes "130" during resonance ejection of the ions from the ion trap, as well as the waveforms utilized for ion isolation and fragmentation are provided by the arbitrary waveform generator (AWG) of an MT Explorer 100 (MassTech, Columbia Md.) instrument. Output of the AWG is connected to the unbalanced input of a 50 Ohm to 1200 Ohm BALUN step-up transformer (North Hills Signal Processing, Syosset, N.Y.) which balanced outputs are connected to the end cap electrodes "130", FIG. 4.

Amplification of the signals picked up from the anode of the electron multiplier in the detector "160" and their conversion into the digital form is performed using amplifier board ("180", FIG. 4) and digitizer of an "MT Explorer 100" (MassTech, Columbia Md.) quadrupole ion trap mass spectrometer instrument.

Control of the instrument's operation, data acquisition and processing are performed using MODAS software suite (MassTech, Columbia Md.).

Figure 2:
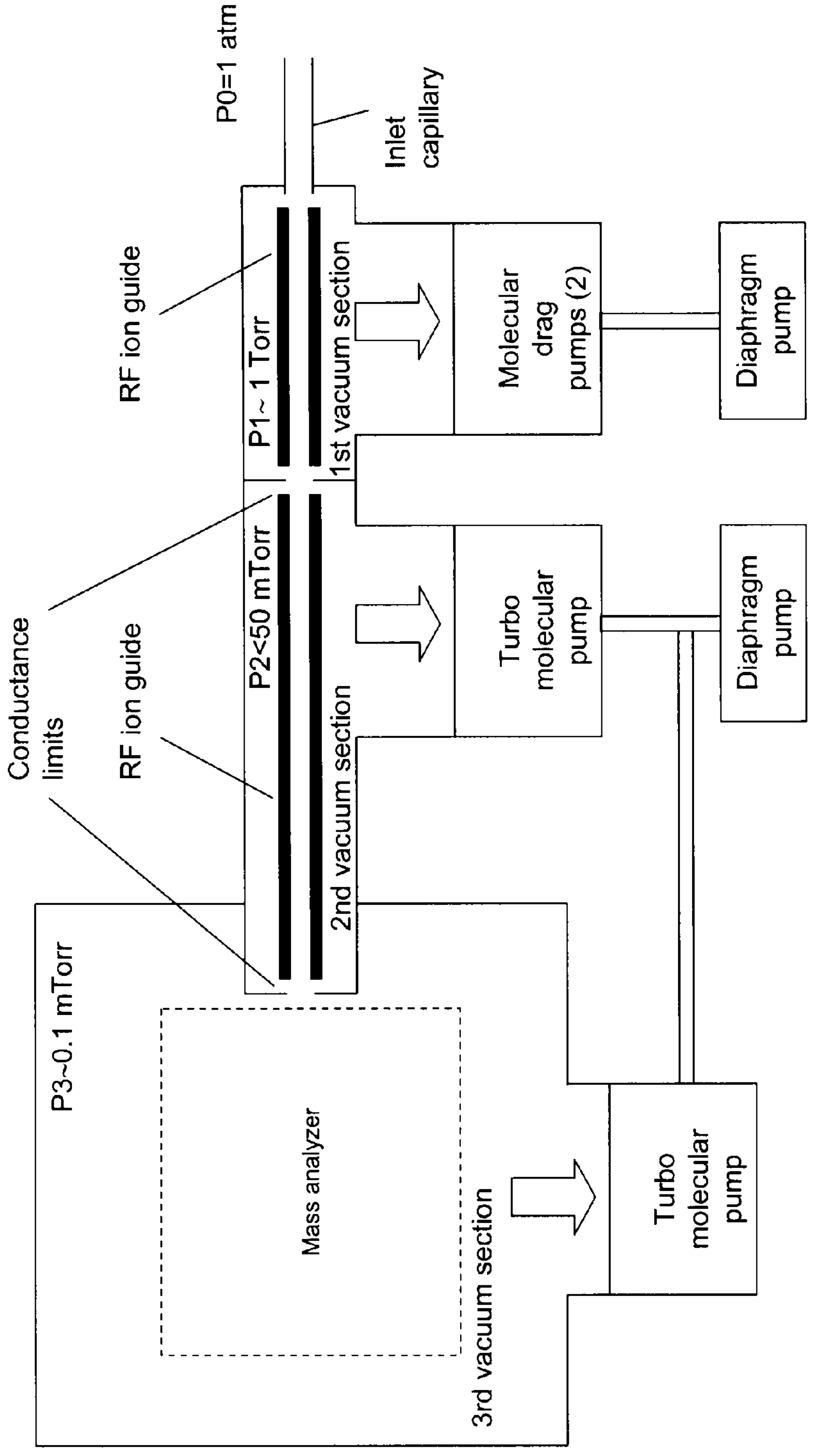
Figure 2 PRIOR ART
FIG. 2 shows a prior art scheme of the atmospheric pressure interface for a portable mass spectrometry.

The performance of the mass analyzer built according to the above described embodiment was compared to that of the commercial MT Explorer 100 system utilizing a "classic" design of the atmospheric pressure interface (FIG. 2). Both systems showed similar sensitivity (intensity of the ion signal) at comparable experimental conditions (the same ion source, ion injection period, detector, and optimal ion guide voltages).

Numerous modifications and variations of the invention are possible in light of the above teachings. It is therefore to be understood that within the scope of the appended claims, the invention may be practiced otherwise than as specifically described herein.

The invention claimed is:

1. A portable mass spectrometer with an atmospheric pressure interface for introducing ions generated at ambient pressure gas conditions into a vacuum of the mass spectrometer, comprising:

a vacuum chamber having at least one vacuum section;

at least one gas inlet for directing the ambient pressure gas including said ions into said at least one vacuum section, said at least one gas inlet having a gas passage channel of a length L and a limiting cross section S with a ratio of L/S being less than 20,000 $cm^{-1}$;

a radio frequency (RF) ion guide in a said at least one vacuum section positioned for collecting said ions from said at least one gas inlet and transmitting the ions further to a mass analyzer; and one or more turbomolecular pumps in gas communication with said at least one vacuum section, said one or more turbomolecular pumps pumping out a majority of the gas directed into said at least one vacuum section by said at least one gas inlet.

2. The spectrometer of claim 1, wherein the mass analyzer comprises at least one of a quadrupole MS, a quadrupole ion trap MS, a linear quadrupole ion trap MS, a time-of-flight MS, a Fourier transform MS, and an Orbitrap MS.

3. The spectrometer of claim 1, wherein said ambient pressure is in the range from 30 Torr to 3,000 Torr, and said at least one vacuum section is pumped to a pressure of less than 50 mTorr.

4. The spectrometer of claim 1, wherein said at least one vacuum section is pumped to a pressure less than 30 mTorr.

5. The spectrometer of claim 1, further comprising an ion source in gas communication with the atmospheric pressure interface; and said ion source comprises at least one of electrospray ionization (ESI) source, atmospheric pressure chemical ionization (APCI) source, atmospheric pressure matrix-assisted laser desorption/ionization (AP-MALDI) source, atmospheric pressure photoionization (APPI) source, direct analysis in real time (DART) source, a desorption ESI (DESI) source, and a secondary ESI (s-ESI) source.

6. The spectrometer of claim 1, wherein said at least one gas inlet comprises at least one of a capillary and an orifice.

7. The spectrometer of claim 6, wherein said capillary comprises at least one of straight section and a curved section.

8. The spectrometer of claim 1, wherein said gas passage channel has said cross section in a form of at least one of a round section, a square section, and a polygon section.

9. The spectrometer of claim 1, wherein said gas passage channel has an exit end;

said RF ion guide has an entrance end; and said exit end of the gas passage channel and said entrance end of the RF ion guide spaced apart at a distance of less than 3 mm.

10. The spectrometer of claim 8, wherein said distance is less than 1.5 mm.

11. The spectrometer of claim 1, wherein said ratio of L/S is less than 10,000 $cm^{-1}$.

12. The spectrometer of claim 1, wherein said RF ion guide comprises at least one of a multipole RF ion guide, a segmented ring RF ion guide, and an RF ion funnel.

13. The spectrometer of claim 12, wherein said multipole RF ion guide comprises at least one of a quadrupole ion guide, a hexapole ion guide, and an octopole ion guide.

14. The spectrometer of claim 12, wherein said multipole RF ion guide has an inscribed diameter less than 9 mm.

15. The spectrometer of claim 12, wherein said multipole RF ion guide has an inscribed diameter less than 3 mm.

16. The spectrometer of claim 1, further comprising a diaphragm pump providing a backing pressure for at least one of said one or more turbomolecular pumps.

17. The spectrometer of claim 1, wherein said one or more turbomolecular pumps pumps out more than ninety percent of the gas directed into said at least one vacuum section by said at least one gas inlet.

18. The spectrometer of claim 1, wherein said one or more turbomolecular pumps pumps out more than fifty percent of the gas directed into said at least one vacuum section by said at least one gas inlet.

19. A portable mass spectrometer with an atmospheric pressure interface for introducing ions generated at ambient pressure gas conditions into a vacuum of the mass spectrometer, comprising a vacuum chamber having at least one vacuum section;

at least one gas inlet for directing the ambient pressure gas including said ions into said at least one vacuum section, said at least one gas inlet having a gas passage channel of a length L and a limiting cross section S with a ratio of L/S being less than 20,000 $cm^{-1}$;

a radio frequency (RF) ion guide in a said at least one vacuum section positioned for collecting said ions from said at least one gas inlet and transmitting the ions further to a mass analyzer;

at least one pump in gas communication with said at least one vacuum section for pumping said at least one vacuum section to less than 50 mTorr pressure.

20. A portable mass spectrometer with an atmospheric pressure interface for introducing ions generated at ambient pressure gas conditions into a vacuum of the mass spectrometer, comprising:

a vacuum chamber having at least one vacuum section;

at least one gas inlet for directing the ambient pressure gas including said ions into said at least one vacuum section, said at least one gas inlet having a gas passage channel of a length L and a limiting cross section S with a ratio of L/S being less than 20,000 $cm^{-1}$;

one or more turbomolecular pumps in gas communication with said at least one vacuum section, said one or more turbomolecular pumps pumping out a majority of the gas directed into said at least one vacuum section by said at least one gas inlet; and at least one diaphragm pump providing a backing pressure for at least one of said one or more turbomolecular pumps.

* * * * *